United States Patent Office 3,264,238
Patented August 2, 1966

3,264,238
COATING COMPOSITIONS COMPRISING LATEX PAINT, HYDROCARBON AND PLASTIC-SURFACED PARTICLES
Alphonse Raymond Wallen, Chicago, Ill., assignor to United States Gypsum Company, a corporation of Illinois
No Drawing. Filed Aug. 29, 1963, Ser. No. 305,528
7 Claims. (Cl. 260—23.7)

This invention relates to coating compositions and more particularly to water thinned latex or modified latex paints, hereinafter sometimes referred to as latex paint, and additives for the paints. When such a paint having such an additive therein is applied to a surface, as for example, to a plaster or gypsum board ceiling or wall surface, thin discrete decorative particles, hereinafter sometimes referred to as flakes, appear against a background of the paint.

When flakes of the types hereinafter described are placed in conventional pigmented coating compositions, the flakes are wetted-out or otherwise prevented from popping-out or showing when a surface is coated with such a composition. It is an important object of this invention to provide a coating composition which will readily produce visible flakes which are firmly adhered to a background of pigmented paint when the coating composition is applied by conventional application methods to a surface.

It is an object of this invention to provide a coating composition that can be applied in a one coat operation to a surface with conventional application methods resulting in a decorated surface having random flakes appearing against a background of pigmented paint.

It is an object of this invention to provide an additive containing decorative flakes for addition to a water thinned latex paint to achieve the aforesaid objects, and, to formulate said additive from conventional materials.

It is yet another object of this invention to provide an additive for a latex paint that may be added to the paint prior to application to a surface thereby obviating the necessity for a manufacturer, jobber, or dealer to carry separate lines of specially formulated paint inventory to supply market demands for coating compositions of the type herein described.

Still another object is to provide an additive of the type herein described that requires no specialized skill to use with a latex paint, the formulation accomplished by simply stirring an additive into a paint prior to application of the coating composition thus prepared to a surface.

Further and additional objects and advantages will appear from the following detailed description.

In a most elementary sense, the coating compositions of this invention may be prepared by adding thin decorative flakes, for example coated metallic flakes, to a hydrophobic volatile hydrocarbon liquid with or without the presence of aluminum stearate therein depending on the liquid selected. An additive so prepared is stirred into a water thinned pigmented latex paint prior to application of the coating composition to a surface.

WATER THINNED LATEX OR MODIFIED LATEX TYPE PAINTS

Paint vehicular binders that may be used in practicing this invention include styrene-butadiene copolymer, polyvinyl acetate and copolymers thereof, and acrylic latices as well as alkyd modified latices, as for example, an alkyd modified styrene-butadiene emulsion. Various conventional materials such as fillers, pigments and other colorants, thickening agents, etc., are added to the latices, as are well known in the paint formulating art.

ADDITIVES FOR LATEX PAINTS

Without commitment to theory, it is felt that when thin decorative flakes are added to a hydrophobic volatile hydrocarbon liquid, and the liquid containing the flakes is added to a water thinned latex paint, said liquid prevents the paint from wetting the flakes and otherwise aids in migration of said flakes to the visible surface of a wall or ceiling when paint is applied thereto. Moreover, the addition of aluminum stearate, particularly to certain liquids, increases the pot-life of a coating composition, enabling a longer period for application of the coating to a surface from the time an additive is dispersed into a paint, after which period the flakes do not tend to produce the desired pop-out.

Liquids useful in practicing this invention included xylene, toluene, turpentine, and particularly mineral spirits. Flake pop-out results are also obtainable with V.M. & P. naphtha (Varnish Makers' and Painters' naphtha) and kerosene. Typical polar organic solvents such as methyl isobutyl ketone, ethyl acetate, and capryl alcohol do not produce the desired flake pop-out.

In preparing the additives, thin decorative flakes such as metallic flakes made from aluminum, bronze, and the like, are stirred into the hydrophobic volatile hydrocarbon liquids. The flakes may be coated with materials such as epoxy resin, nitrocellulose, and the like. Such coatings are desirable as they may contain colorants producing colors such as gold, silver, blue, green, copper, and other colors, thereby enabling the choice of a particular color or colors according to esthetic taste. Additionally such coatings are also desirable to prevent reactions with certain flakes such as for example with aluminum flakes which would otherwise tend to discolor on exposure to air after a coating composition has been applied to a surface. Epoxy coated aluminum flakes are particularly desirable being commercially available in many sizes, such as in sizes as about .015" x .008", .008" x .006", .006" x .004", and $\frac{1}{64}$", $\frac{1}{32}$", $\frac{1}{16}$", and $\frac{1}{8}$" squares. These sizes are commercially available in thicknesses of about .0008" and .00045".

Nitrocellulose coated aluminum flakes produce good results particularly with polyvinyl acetate latex paints; however, nitrocellulose coatings with alkyd modified latices do not tend to produce adequate results. Moreover, acrylic latex paint compositions are observed to produce a noticeable white discoloration around the periphery of epoxy coated aluminum flakes when such a composition containing such flakes is applied to a surface. Possibly monomers present in the acrylic emulsion attacking raw edges of the flakes would account for the discoloration.

The following specific examples are given to further illustrate the practice of this invention. It is understood that these examples are merely illustrative and are not to be construed as limiting the scope thereof.

Typical latices into which additives may be dispersed:

*Example 1.—Alkyd modified styrene-butadiene copolymer latex paint—100 gallon batch*

Pigment dispersion:
| | |
|---|---|
| Water | 135 |
| Carboxymethylcellulose (1½%) | 100 |
| Wetting agent (Tamol 731, an anionic polymer type dispersing agent comprising the sodium salt of carboxylated polyelectrolyte) | 4 |
| Fungicide (Dowicide A, the sodium salt of o-phenylphenol and Dowicide G, the sodium salt of pentachlorophenol, 1 to 1 mixture—20%) | 35 |
| Titanium dioxide, Rutile | 230 |
| Clay | 75 |
| Calcium carbonate | 140 |
| Ultramarine blue | 0.4 |
| Anti-foaming agent (Polypropylene glycol P-1200) | 3 |
| | 722.4 |

Alkyd emulsion (high speed mixer):
| | |
|---|---|
| Long oil soya alkyd | 35 |
| 6% cobalt naphthenate | 3 |
| Wetting agent (Igepal CO-630, alkyl phenoxy polyoxyethylene ethanol) | 6 |
| Potassium hydroxide (10% solution) | 1 |
| Water | 28 |
| | 70 |

Let down:
| | |
|---|---|
| Pigment dispersion | 722.4 |
| Alkyd emulsion | 70 |
| Carboxymethylcellulose (1½%) | 100 |
| Diethylene glycol | 15 |
| Styrene-butadiene (latex 762-W 48% solids) | 200 |
| Potassium hydroxide (10% solution) | As required |
| Anti-foaming agent | As required |
| Total weight, lbs. | 1227.4 |

*Example 2.—Vinyl acetate copolymer latex paint (white and light tint base)—100 gallon batch*

| | |
|---|---|
| Water | 60.0 |
| Potassium tripolyphosphate | 1.0 |
| Wetting agent (Tamol 731, an anionic polymer type dispersing agent comprising the sodium salt of carboxylated polyelectrolyte) | 4.0 |
| Nonionic wetting agent, Advawet No. 33, an ethylene oxide condensation product of fatty acid esters | 4.0 |
| Ethylene glycol | 30.0 |
| Anti-foaming agent (Foamicide 581-B) | 1.0 |
| Fungicide (Phenyl mercury acetate—Troysan PMA-30) | 4.5 |
| Titanium dioxide (Rutile) | 175.0 |
| Calcium carbonate | 50.0 |
| Magnesium silicate (Nytal 300) | 40.0 |
| Magnesium silicate amorphous | 50.0 |
| Aluminum silicate | 75.0 |
| Methyl cellulose—2% solution (Methocel 4000 cps.) | 75.0 |
| Water | 60.0 |

Disperse the above in a high speed mill, and then add the following, stirring slowly with agitation:

| | |
|---|---|
| Methyl cellulose—2% solution | 96.0 |
| Polyvinyl acetate-dibutyl maleate copolymer (National Starch and Chemical Corp.—Resyn 1255, 55% solids) | 349.0 |
| Anti-foaming agent (Foamicide 581-B) | 1.0 |
| Water | 58.5 |
| Carbitol acetate | 7.0 |
| Total weight, lbs. | 1141.0 |

*Example 3.—Acrylic latex paint (white)— 100 gallon batch*

| | |
|---|---|
| Water | 92.5 |
| Wetting agent (alkyl aryl ether—Triton CF-10) | 2.0 |
| Wetting agent (an anionic polymer type dispersing agent comprising the sodium salt of carboxylated polyelectrolyte—Tamol 731) | 7.8 |
| Anti-foaming agent | 2.0 |
| Ammonium hydroxide (28%) | 1.0 |
| Titanium dioxide (rutile) | 175.0 |
| Titanium dioxide (chalking anatase) | 75.0 |
| Calcium carbonate (5 microns) | 185.0 |

Mix above about ten minutes and then add:

| | |
|---|---|
| Water | 45.2 |

Pass the above through a high speed mill and then add the following in the order indicated:

| | |
|---|---|
| Acrylic ester emulsion 55% solids (Rhoplex AC-55) | 473.0 |
| Ethylene glycol (premix) | 30.0 |
| Fungicidal preservative (mercurial) (premix) | 9.0 |
| Anti-foaming agent | 2.0 |
| Methyl cellulose (2% solution—4000 cps.) | 75.5 |
| Total weight, lbs. | 1175.0 |

*Examples 4 through 12*

The table below indicates results that can be obtained by firstly preparing an additive by mixing gold colored epoxy coated aluminum flakes in the liquid indicated, and adding the additive to a quart size lot of the paints in Examples 1 through 3. The flakes can average about 1/32″ by 1/32″ by .0008″ in thickness. The paints can be applied to gypsum board by spray gun application using a spray gun having an .08″ opening, using 45–60 pounds per square inch line pressure, and 15 to 20 pounds per square inch pot pressure, and by applying the coatings within about ½ hour of adding the additives to the lots.

| Examples | Flakes, grams | Liquid and Weight | Flake Pop-out Results |
|---|---|---|---|
| 4 | 11.0 | 44 grams mineral spirits | Good. |
| 5 | 11.0 | 44 grams xylene | Do. |
| 6 | 11.0 | 44 grams toluene | Do. |
| 7 | 11.0 | 44 grams turpentine | Do. |
| 8 | 11.0 | 44 grams V.M. & P, naphtha | Fair. |
| 9 | 11.0 | 44 grams kerosene | Do. |
| 10 | 11.0 | 44 grams methyl isobutyl ketone | No pop out. |
| 11 | 11.0 | 44 grams ethyl acetate | Do. |
| 12 | 11.0 | 44 grams capryl alcohol | Do. |

*Examples 13 through 16*

Additives can be prepared similarly to the additives in Examples 4, 7, 8, and 9 excepting aluminum stearate is added to the liquids in an amount of about 2% aluminum stearate by weight of the combined weight of aluminum stearate and liquid without flakes therein. The aluminum stearate thickens the additives and increases pot-life of the coatings prepared by dispersing additives into paints. Results indicate that pot-life can be increased from about ½ hour to over 4 hours using aluminum stearate in the formulation in Example 1. Kerosene and aluminum stearate would be a less desirable combination because of the elevated temperatures necessary to make the gel between the kerosene and aluminum stearate.

*Examples 17 through 22*

Additives can be prepared similarly to those in Examples 4 through 9 (i.e. without aluminum stearate). When added to the paint in Example 1 having about ½ each of the alkyd resin and styrene-butadiene copolymers present therein, pot-life was observed to increase to over 4 hours.

Examples 23 through 26

When additives were prepared according to Examples 13 through 16 (i.e. with aluminum stearate therein), and added to the paint in Example 1 having about ½ each of the alkyd resin and styrene-butadiene copolymer indicated as present therein, pot-life was observed to increase to over 24 hours.

Example 27

It was observed that protein thickeners, as for example, casein, in lieu of the synthetic thickener carboxymethylcellulose in the paint in Example 1 resulted in flake pop-out; however, a water thinned paint comprising primarily casein as the binder in lieu of a latex binder, did not produce acceptable results.

From the foregoing examples, it becomes apparent that additives that contain only a hydrophobic volatile hydrocarbon liquid, such as mineral spirits, and flakes will give excellent pot-lifes in most instances, but that increased pot-lifes can be realized when the additives contain certain liquids and about 2% by weight of aluminum stearate of the combined weight of aluminum stearate and a liquid. Moreover, less than 2%, e.g. about 1%, of aluminum stearate was observed to produce little increased pot-life in tests using the paint formulations in Examples 1 through 3 over additives without aluminum stearate therein. Further, it was observed that more than 2%, e.g. about 3%, of aluminum stearate tended not to produce increased flake pop-out over 2%, and, in some instances 3% and over inhibited flake pop-out.

Although the coating compositions according to the teachings herein can be applied by paint brushes or rollers to various surfaces, application by spray gun, when a gun is properly selected and used, can most effectively be employed. Spray gun opening size will depend on the size of flakes selected, and, this may be determined by testing, bearing in mind that the opening size must be sufficiently large enough to allow for the passage of the flakes. However, the larger the size of the opening of the spray gun, the greater will be the tendency for too much paint to strike a surface resulting in running of the paint.

Having thus described this invention, it will, of course, be understood that variations may be made therein and it is contemplated, therefore, by the appended claims, that any such variations as fall within the true spirit and scope of this invention, are therefore covered.

I claim:

1. A two package coating composition comprising in a first package and as a major component a water thinned latex paint and in a second package a minor component adapted to be dispersed in said paint in an amount to produce a decorative effect after application of the mixture of the two components, said minor component comprising a volatile hydrophobic hydrocarbon liquid and a plurality of decorative plastic surfaced particles each having a major surface with an area from about $24 \times 10^{-6}$ sq. inches to about $15.6 \times 10^{-3}$ sq. inches.

2. The composition of claim 1 wherein the latex paint is sufficiently pigmented to produce a substantially opaque film.

3. The composition of claim 1 wherein the additive minor component comprises about 1% by weight of the composition.

4. The composition of claim 1 wherein the hydrocarbon liquid comprises about 80% by weight of the additive.

5. An additive dispersible in a water thinned latex paint, said additive comprising by weight about 20% decorative particles having surfaces of a plastic selected from the group consisting of epoxy resin and nitrocellulose, and each having a major surface with an area from about $24 \times 10^{-6}$ sq. inches to about $15.6 \times 10^{-3}$ sq. inches, about 80% of a hydrocarbon liquid and 1% to 3% aluminum stearate.

6. The additive composition of claim 4 wherein the liquid portion of the additive is selected from the group consisting of mineral spirits, xylene, toluene, turpentine, V.M. & P. naphtha and kerosene.

7. The method of preparing a coating composition comprising the steps of first preparing an additive by mixing about 20 parts by weight of decorative plastic surfaced particles with about 80 parts by weight of a hydrophobic hydrocarbon liquid, thickening the mixture by adding from 1 to 3 parts by weight aluminum stearate and dispersing about 1% by weight, based on the total coating composition, of the prepared additive in a separately prepared water thinned latex paint.

References Cited by the Examiner

UNITED STATES PATENTS

| | | | |
|---|---|---|---|
| 3,025,252 | 3/1962 | Jack | 260—23 |
| 3,053,676 | 9/1962 | Higbee | 117—160 |
| 3,092,601 | 6/1963 | Sullivan et al. | 260—29.6 |

OTHER REFERENCES

Chatfield: "Varnish Constituents" (1953), page 573.

LEON J. BERCOVITZ, *Primary Examiner.*

R. A. WHITE, *Assistant Examiner.*